(12) United States Patent
Dziatkiewicz (10) Patent No.: US 12,275,343 B2
(45) Date of Patent: Apr. 15, 2025

(54) FOLD-UP CONVERTIBLE CAMPER BED/BENCH

(71) Applicant: Donald Dziatkiewicz, Fort Pierce, FL (US)

(72) Inventor: Donald Dziatkiewicz, Fort Pierce, FL (US)

( * ) Notice: Subject to any disclaimer, the term of this patent is extended or adjusted under 35 U.S.C. 154(b) by 0 days.

(21) Appl. No.: 18/126,570

(22) Filed: Mar. 27, 2023

(65) Prior Publication Data
US 2025/0042324 A1    Feb. 6, 2025

Related U.S. Application Data

(60) Provisional application No. 63/314,979, filed on Feb. 28, 2022.

(51) Int. Cl.
*B60P 3/39* (2006.01)
*B60N 3/00* (2006.01)

(52) U.S. Cl.
CPC ............... *B60P 3/39* (2013.01); *B60N 3/008* (2013.01)

(58) Field of Classification Search
CPC ... B60N 2/34; B60N 3/008; B60P 3/38; B60P 3/39; A47C 17/17; A47C 17/175; A47C 17/1756; A47C 17/80
USPC ............... 5/2.1, 37.1, 42.1, 43, 47, 48, 118; 296/65.01, 69, 190.02
See application file for complete search history.

(56) References Cited

U.S. PATENT DOCUMENTS

| | | | | |
|---|---|---|---|---|
| 1,544,959 A | * | 7/1925 | Wasmuth | A47B 5/06 248/240.1 |
| 3,140,114 A | * | 7/1964 | Stephenson | B60N 2/34 5/118 |
| 3,188,134 A | * | 6/1965 | Nixon | B60N 2/34 5/48 |
| 3,246,347 A | * | 4/1966 | Mason | B60N 2/34 5/118 |
| 3,473,840 A | * | 10/1969 | Miles | B60N 2/34 297/118 |
| 3,910,626 A | * | 10/1975 | Hobbensiefken | B60N 2/34 297/118 |
| 3,946,678 A | * | 3/1976 | Birge, II | B60P 3/36 296/156 |
| 4,005,898 A | * | 2/1977 | Way | B60P 3/423 5/118 |
| 4,512,048 A | * | 4/1985 | Isham | A47C 17/80 297/65 |
| 4,563,784 A | * | 1/1986 | Shrock | A47C 17/1756 5/47 |
| 4,625,346 A | * | 12/1986 | Quackenbush | A47C 17/1756 5/51.1 |
| 4,688,842 A | * | 8/1987 | Arbenius | B60N 2/34 296/69 |
| 5,195,194 A | * | 3/1993 | Bradley | A47C 17/1756 5/47 |

(Continued)

*Primary Examiner* — David R Hare
(74) *Attorney, Agent, or Firm* — The Rapacke Law Group; Andrew Rapacke (57) ABSTRACT

A fold-up bedding conversion system enables the creation of a larger sized bed that may be used in limited space situations, where the conversion system includes a frame that includes a substantial portion of the bed and a bench, positioned at a proximal end of the bed, that is rotational movable to enable the back section of the bench to be positioned substantially in-line with the bed.

4 Claims, 11 Drawing Sheets

(56) References Cited

U.S. PATENT DOCUMENTS

| | | | |
|---|---|---|---|
| 5,505,513 A * | 4/1996 | Carsner | B60N 2/34 5/118 |
| 5,718,479 A * | 2/1998 | Rautenbach | B60N 2/34 297/94 |
| 10,906,437 B2 * | 2/2021 | Hunter | A47K 3/32 |
| 11,419,427 B2 * | 8/2022 | Niemela | F16B 12/28 |
| 11,833,955 B1 * | 12/2023 | Sullivan | B60N 2/3095 |

* cited by examiner

FOLD-UP CONVERTIBLE CAMPER BED/BENCH

TECHNICAL FIELD

The embodiments presented relate to bedding and, in particular a device for expanding a size of a bed.

BACKGROUND

Recreation Vehicles (RTVs), such as campers, vans, etc. are extremely popular with the public as they provide a means to travel and explore the countryside at a reasonable cost, as the use of an RTV allows the user to save expenses on hotels and meals while traveling. Many RTVs include kitchens, bathrooms and bedrooms that provides the user with the comforts of a home while on the road However, RTVs are by design of a limited space and, thus, there are limitations on the facilities that are used. For example, kitchens may have only a single electric burner, a small size refrigerator. Similarly, the bathroom shower stall may be limited to an 18×18 inch space. Bedrooms are also limited in size and may only include a limited size bed.

It is known in the RTV to include items that provide for dual purpose. For example, a table with its bench seating may be converted into a bed by removal of the table top and moving cushions into the same between the fixed bench seating. The cushions may, for example, be the back cushions of the fixed bench seating. Similarly, a bed may be converted into a larger bed by folding down a bench, that includes two ottomans, which are positioned at the foot of the bed such that the folded bench is level to the height of the bed. A filler material between the ottomans to used complete the conversion of the bed to the larger size.

However, this design has a lot to be desired as, even with the filler material added, there are many seams between the cushions and further leaves very little storage as the filler must be stored when not in use.

Hence, there is a need in the industry for a bed configuration that allows for a simpler means for the expanding the bed that are situated in small places.

SUMMARY OF THE INVENTION

The embodiments disclose a bed converting system that simplifies the conversion of an limited space bed.

A conversion structure is disclosed that assists in the conversion of a limited space bedding system A fold-up conversion apparatus is disclosed for the conversion of a bed into a larger size while allowing for additional storage space.

A fold-up bed structure and conversion apparatus is disclosed for the conversion of a bed system to a larger size.

A fold-up bedding conversion apparatus is disclosed for the manual conversion a bed to a larger size.

A fold-up bed conversion apparatus is disclosed for the electro-mechanical conversion of a bed to a larger size.

BRIEF DESCRIPTION OF THE DRAWINGS

A complete understanding of the embodiments and the advantages and features thereof will be readily understood by reference to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no limitations, or inferences, as to the scope of the invention claimed are to be understood therefrom. It is noted that the embodiments reside primarily in combinations of components related to the system and method of use thereof.

The present embodiments are based in part on the ability to provide for the conversion limited space (e.g., an RTV, camper, etc.) bed while removing elements that are generally required to be used to complete the larger bed configuration, which also require space to store.

Figure 1:
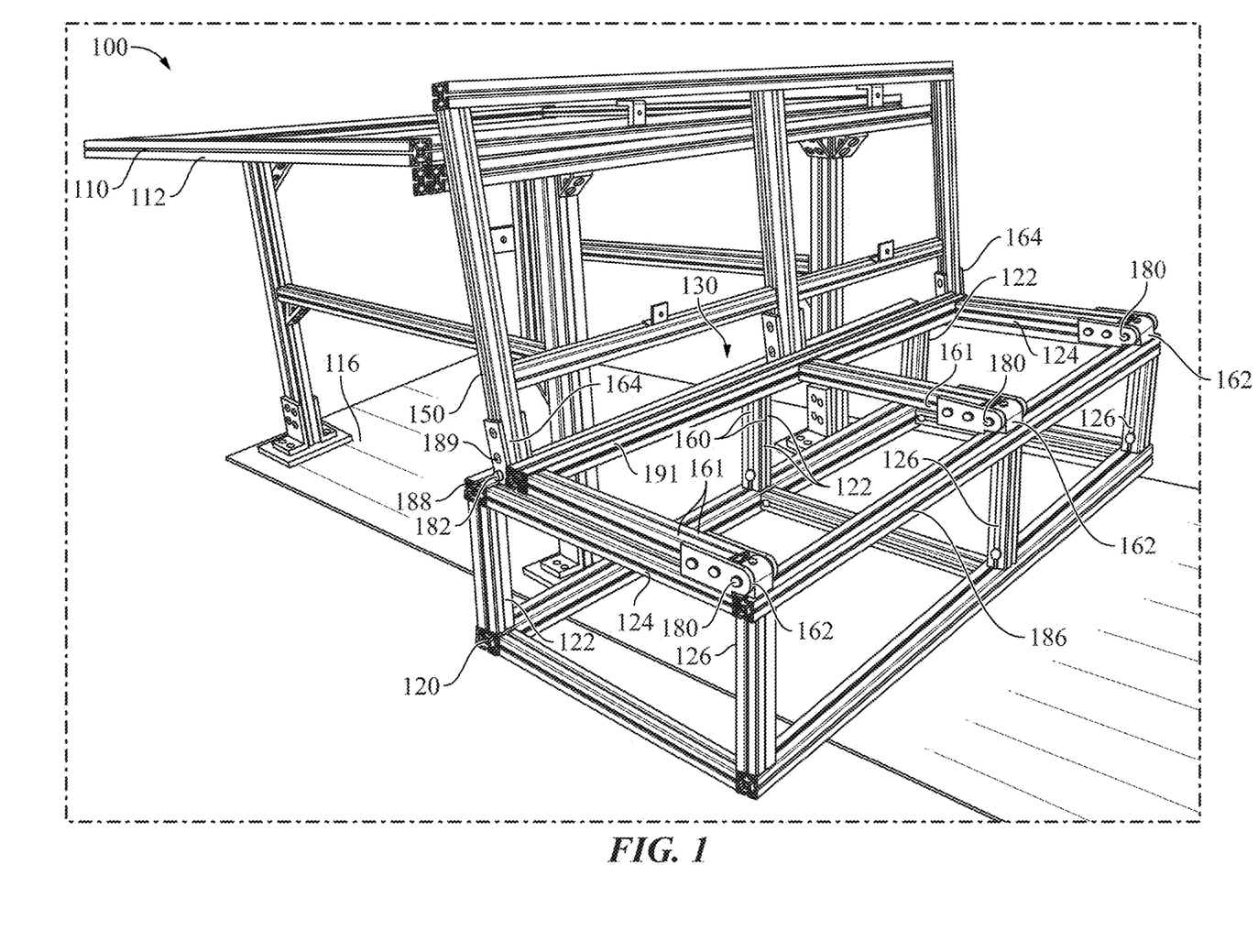
FIG. 1 illustrates a perspective view of a fold-up bed conversion system in accordance with the principles of the invention.

FIG. 1 illustrates a perspective view of the structural components of bed conversion system in accordance with the principles of the invention.

In this illustrated view bed conversion system 100 comprises a bed section 110 and a bench section 120, wherein the bench section 120 is positioned along a proximal (i.e., foot) end of bed section 110.

Bed section 110 comprises a frame (or platform) 112 positioned, substantially horizontally with respect to, and a desired distance above, floor element 116 upon which bed section 110 is placed. Bench section 120, which is positioned along the proximal end of bed section 110 comprises an open frame box-like structure constructed of a plurality of upright elements 122, 126 and raise a top bench strut 124 a desired distance above floor 116. In this illustrated embodiment, uprights 122 are positioned on a distal end of bench section 120, adjacent proximal end of bed section 110, and uprights 126 are positioned on a proximal end of bench section 120. Further illustrated are horizontal connection members 186, 188 arranged along the proximal end and the distal end, respectively, of bench 120. Horizontal connection member 186, 188 in conjunction with top bench struts 124 form top surface 128 of bench section 120.

Positioned along top surface 128, of bench section 120, is seating section 130. Seating section 130 comprises back section 150 and seat section 160. Seat section 160 is positioned adjacent (e.g., on-top of) top surface 128, while back section 150 is positioned along a distal end of seat 160. Seat 160 is composed of a plurality of seat struts 161, which extend from a proximal end of seat 160 to a distal end of seat 160, and a distal end horizontal connector 191 to which is connected to the distal end of each of the plurality of seat struts 161.

Associated with the proximal end of each of the seat struts 161 is proximal hinge 162. Proximal hinges 162 attach a proximal end of seat 160 to a proximal end of bench section 120. Distal hinges 164, positioned at a distal end of each of seat struts 161, attaches a distal end of seat section 160 to a lower edge 189 of back section 150. Hinge 162 allows for the rotational movement of seat 160 with respect to bench section 120 and hinge 164 allows for the rotational movement of back section 150 with respect to seat 160. In the illustrated aspect of the invention, hinge 162 is formed at the intersection of seat strut 161 and upright 126, wherein seat strut 161 and upright 126 each include a passage (not shown) through which a pin or bolt 180 may be inserted. Seat strut 161, accordingly, is rotatable movable, with respect to upright 126, along an axis formed by pin or bolt 180. Similarly, hinge 164, positioned on the distal end of seat strut 161, allows for the rotational movement of back section 150 along an axis formed by pin or bolt 182. Although hinges 162 and 164 are shown as being rotatable about a central axis formed by pins or bolts 180 and 182, it would be understood that hinges 162 and 164 may comprise conventional hinges, such as a combination of door hinges or a single (or a plurality of) piano hinge(s) attached along horizontal element 191, etc. without altering the scope of the invention claimed.

In this illustrated embodiment of bed conversion system 100, bed section 110, bench section 120 and seating section 130 are shown constructed of a light weight material, such as aluminum. Although aluminum construction is shown, and discussed, it would be recognized that bed section 110, bench section 120 and seating section 130 may be constructed of materials that are known to provide sufficient structural support for the purpose shown. For example, steel, wood or industrial plastics or a combination thereof.

Figure 2:
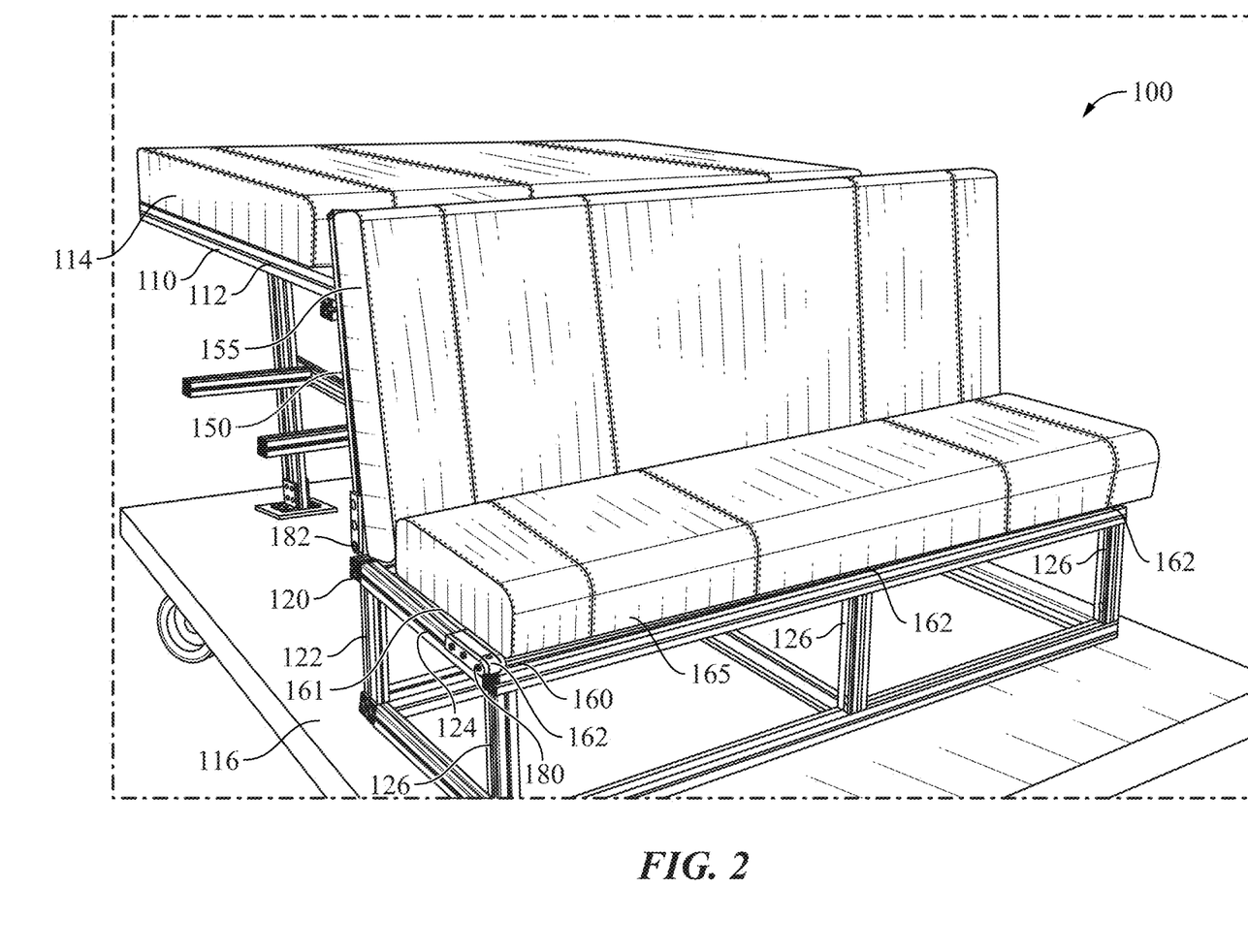
FIG. 2 illustrates a perspective view of an initial position of the fold-up bed conversion system shown in FIG. 1

FIG. 2 illustrates a perspective view of an initial position of a completed bed conversion system 100 in accordance with the principles of the invention.

In this illustrated initial position, bedding system 100 is shown including back cushion 155 and seat cushion 165 positioned on back section 150 and seat section 160, respectively. Cushions 155 and 165 may be removably attached to back section 150 and seat section 160 to allow for their cleaning or changing of the fabric (e.g., cloth, plastic) or color. Further shown is platform cushion 114 positioned on frame 112. Platform Cushion 114, similar to bench cushion 155 and seat cushion 165, may be removably attachable to frame 112. In one aspect of the invention cushions 114, 155 and 165 may be made from one of: a vinyl material, a plastic type material, a leather material, a fabric and combinations thereof.

Figure 3:
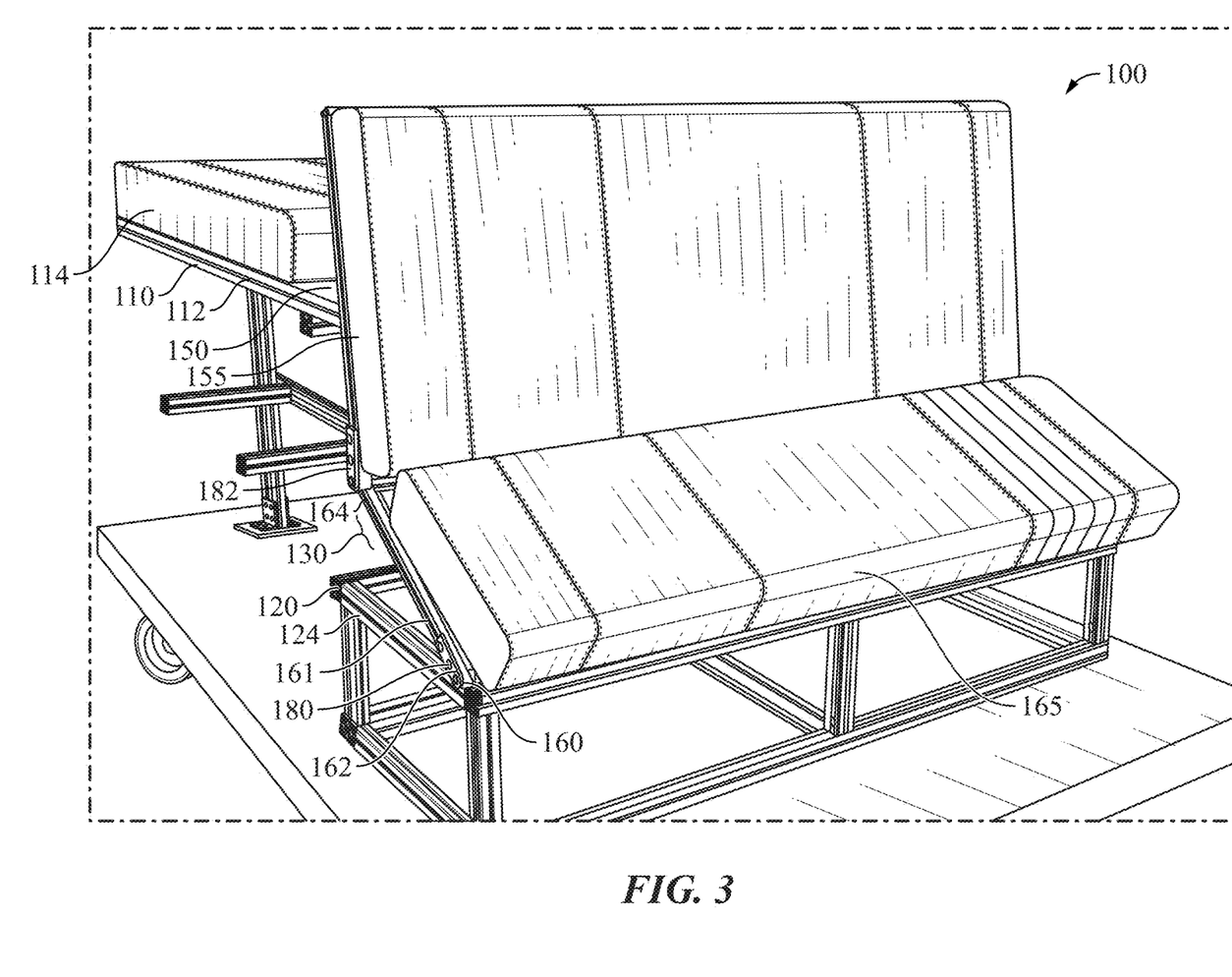
FIG. 3 illustrates a perspective view of intermediate positions of the fold-up bed conversion system shown in FIG. 2.

FIG. 3 illustrates prospective view of a first intermediate position of a bed conversion system in accordance with the principles of the invention.

In this illustrated aspect of the invention, seat 160 is shown in an elevated position by the rotational movement of seat 160 about hinge 162 through pin 180. In one aspect of the invention, rotational movement of seat 160 may be performed manually, by the pulling on a strap (not shown) or electro-mechanically, by actuators (not shown). Further shown is back section 150 raised as seat 160 is raised.

Figure 4:
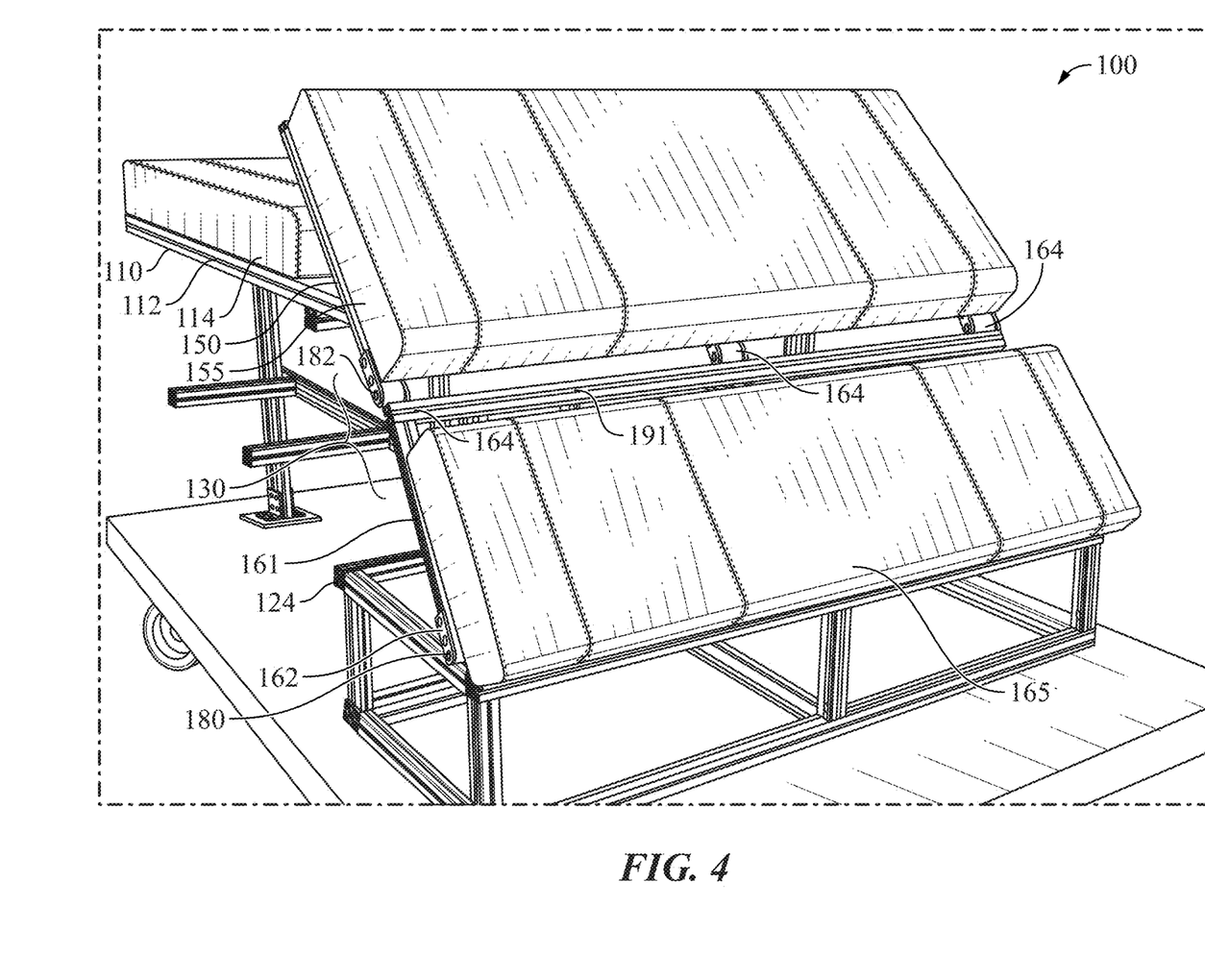
FIG. 4 illustrates a perspective view of a second intermediate position of the fold-up bed conversion system shown in FIG. 2.

FIG. 4 illustrates a perspective view of a second intermediate position of the bed conversion system shown in FIG. 2.

In this illustrated second perspective view, rotational movement of seat section 160 is shown further rotated with respect to pin 180 about hinge 162. In addition, back section 150 is shown still further elevated from bench 160 and rotated about hinge 164 about the axis formed by pin 182.

Figure 5:
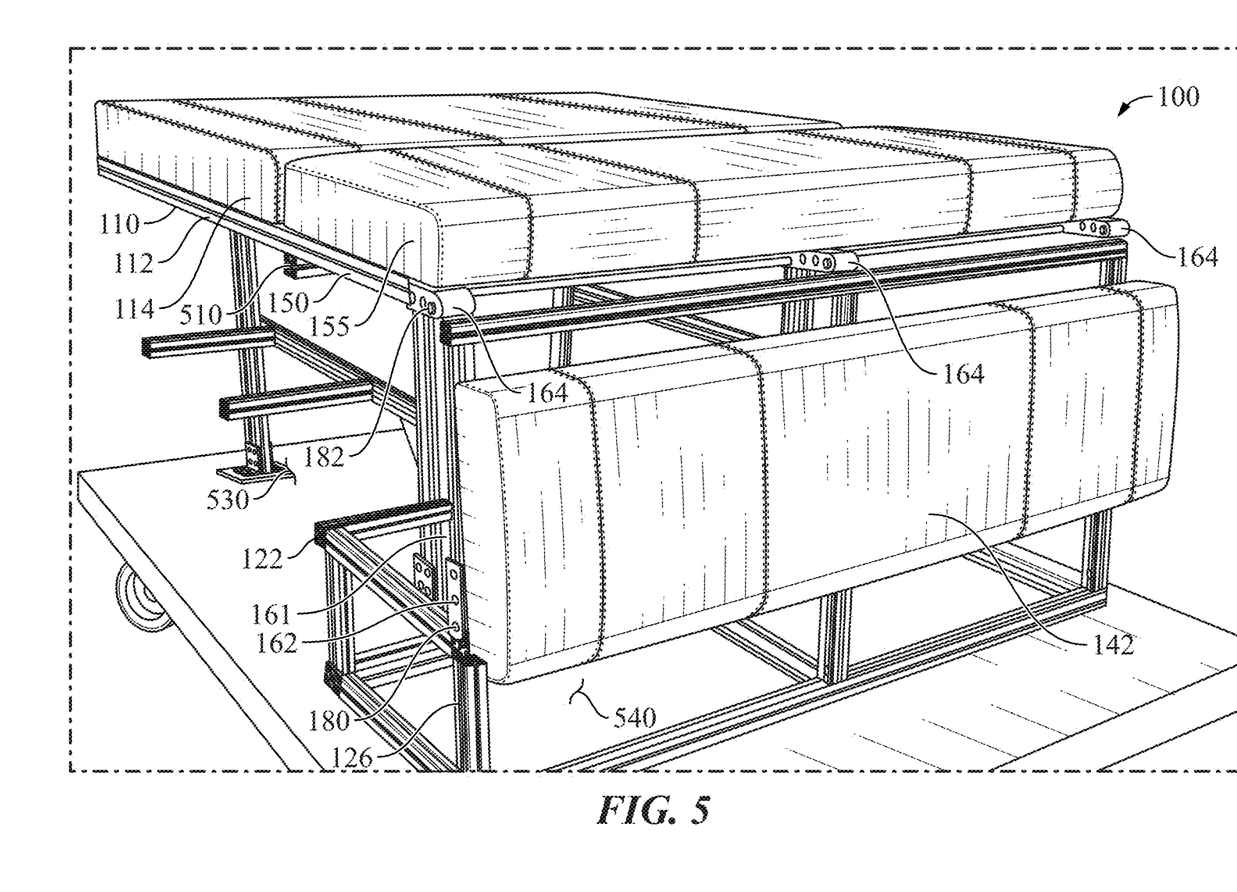
FIG. 5 illustrates a perspective view of a final position of a fold-up bed conversion system shown in FIG. 2.

FIG. 5 illustrates a perspective view of a final position of a bed conversion system shown in FIG. 2.

In this illustrated view seat 160 is shown rotated from a substantially horizontal position (see FIG. 2) to a substantially vertical position. Further illustrated is back 150 having been rotated from a substantially vertical position to a substantially horizontal position, such that cushion 155 is substantially within a same plane as that of cushion 114. In this illustrated example of the operation of the bed conversion system in accordance with the principle of the invention, proximal hinge 162 has allowed for a substantially ninety (90) degree change in the position of seat 160 while hinge 164 has allowed for the repositioning of back 150 by sustaining a substantially two-hundred-seventy (270) degree change.

In this illustrated view, bedding conversion system actuator is shown including storage area 530 beneath bed section 110 and storage area 540 within bench section 120. Further shown is a ledge element 510 connected to the proximal end of bedding section 110. Ledge element 510 provides a support for back section 150 when back section 150 is raised into a congruent relationship with respect to platform 112.

Figure 6A:
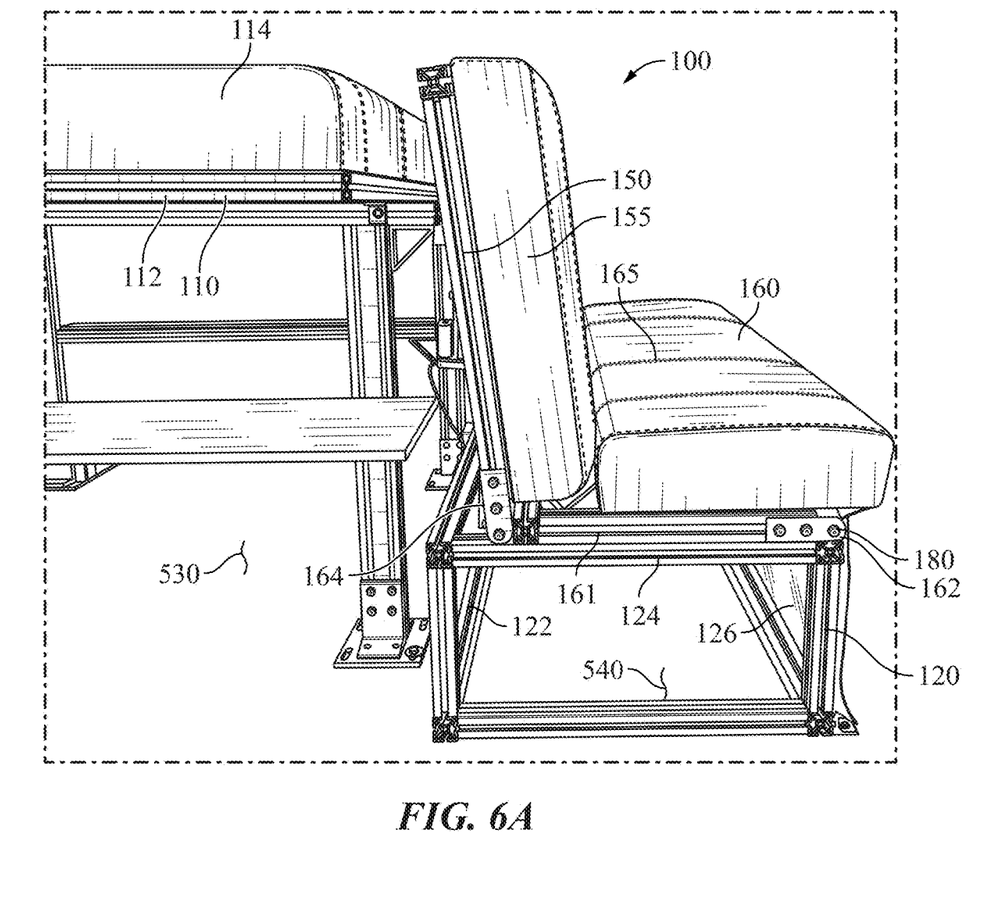
FIGS. 6A and 6B illustrate side views side view of an initial position of a fold-up bed conversion system in accordance with the principles of the invention.

FIG. 6A illustrates a side view of the initial position of a bed conversion system shown herein.

In this illustrated position, seat 160 is positioned on top surface 128 (represented by strut 124) and bench 120 is shown positioned along a proximal end of frame 112 adjacent ledge.

Figure 6B:
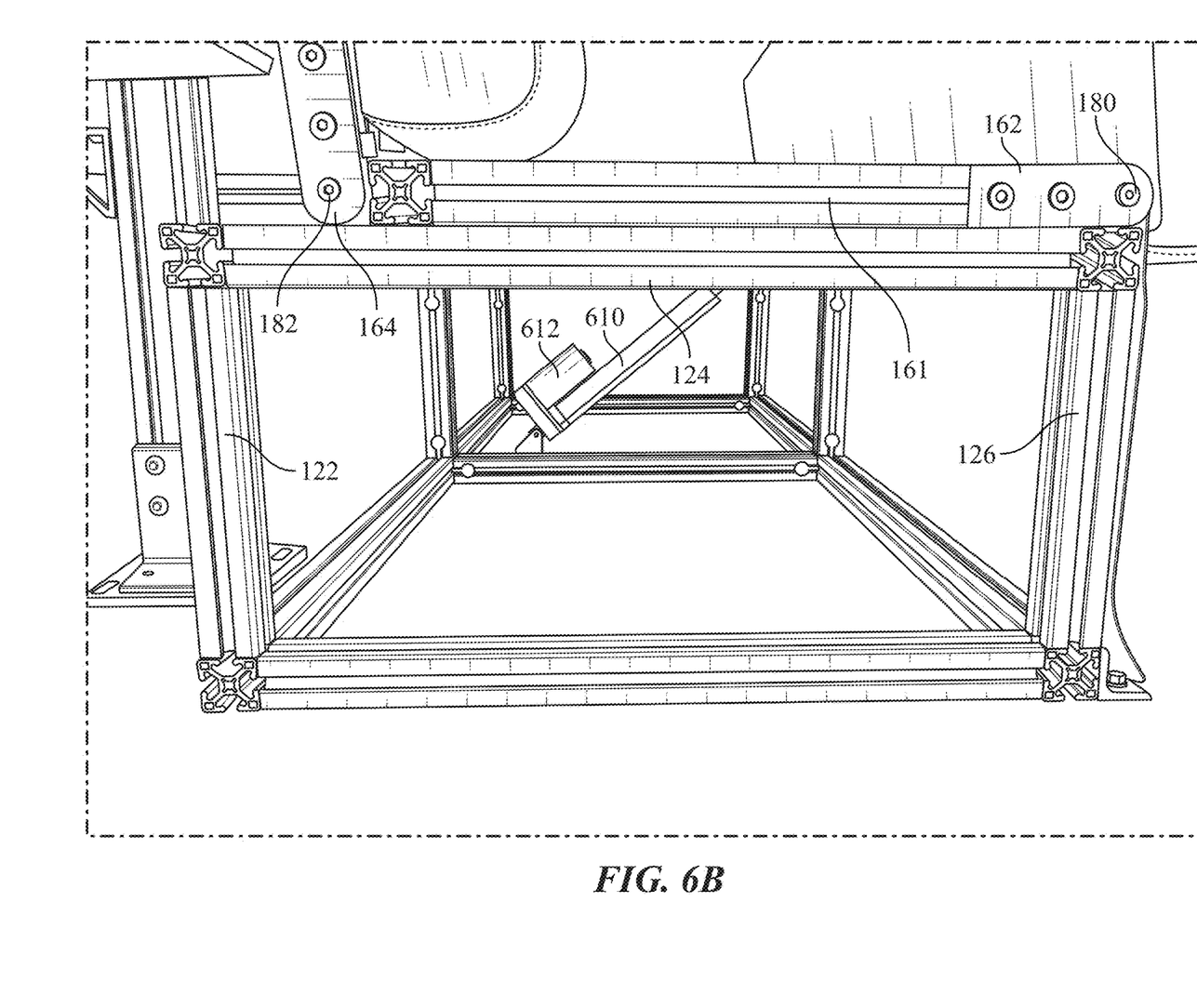

FIG. 6B illustrated a second side view of bench 120, wherein struts 122, 124 and 126 form a space 540 therebetween. Further illustrate is linear strut 610 and motor assembly 612, wherein strut 610 is attached between bench 120 and a lower surface (not shown) of seat 160. Linear strut 162 is configured to electro-mechanically raise seat 160 by sustainably ninety (90) degrees into a position as shown in FIG. 5, for example. Motor assembly 162, which may be powered by an A/C (alternating current) or a D/C (direct current) electrical source, is configured to extend an arm of linear strut 610, as is known in the art. In one aspect of the invention, a control of motor assembly 162 may further include a wireless system, wherein the wireless system (e.g., BLUETOOTH, or similar short-range communication system protocol) may be used to control motor assembly 612 to extend or contract linear strut 610. In this exemplary aspect of the invention, linear strut 610 may be activated by a dedicated remote switch. Alternatively motor assembly 612 may be activated using an application installed on a cellular telephone (e.g., IPhone) that may be used to extend or contract linear strut 610.

Figure 7A:
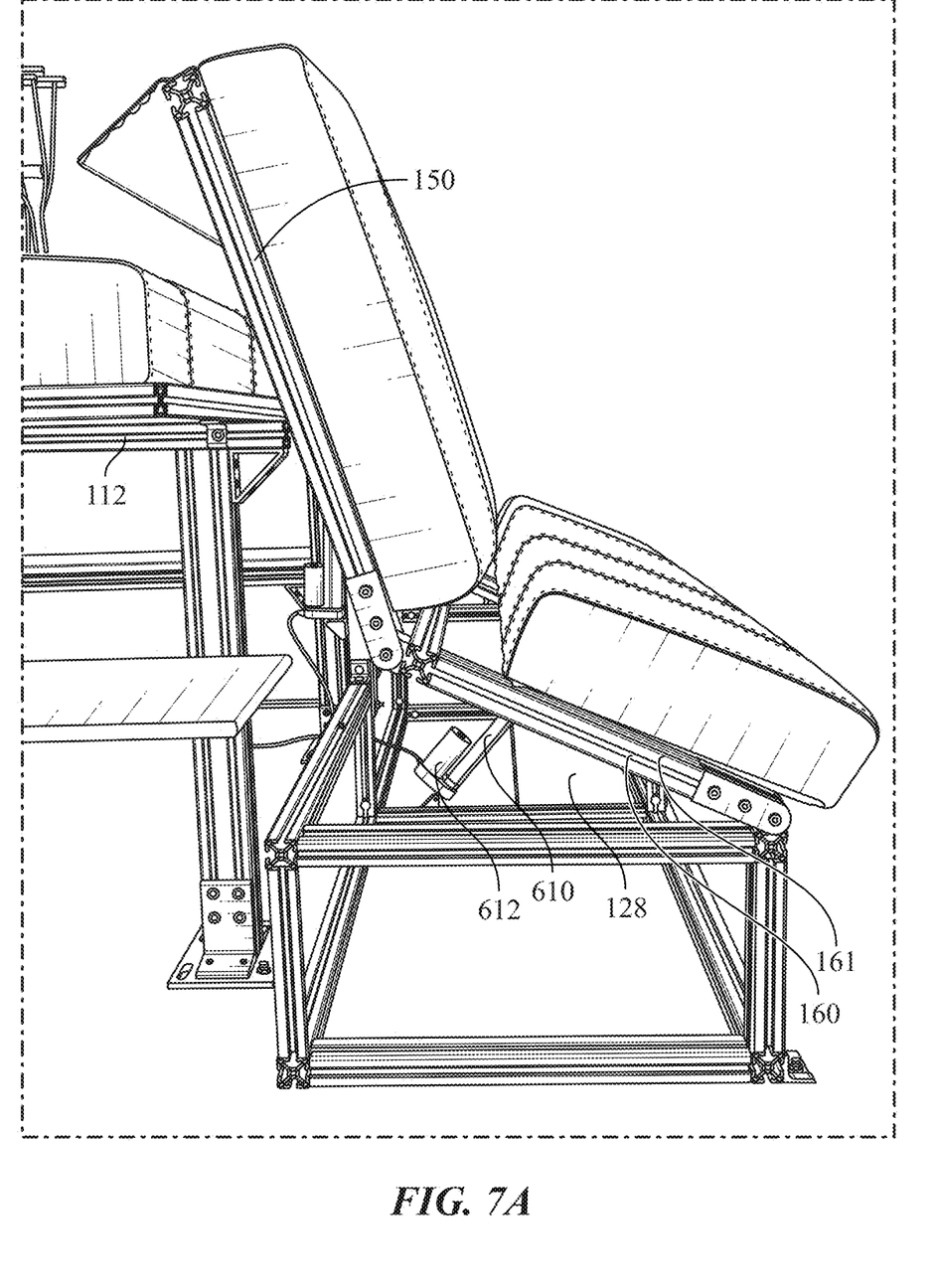
FIGS. 7A and 7B illustrate a sides view of intermediate positions of a fold-up bed conversion system in accordance with the principles of the invention.

FIG. 7A illustrates a side view of a first intermediate position of a bed conversion system in accordance with the principles of the invention.

In this illustrated example, linear strut 610 is shown in an extended configuration wherein seat 160 is raised off of top surface 128. Further shown is back section 130 raised with respect to platform 112.

Figure 7B:
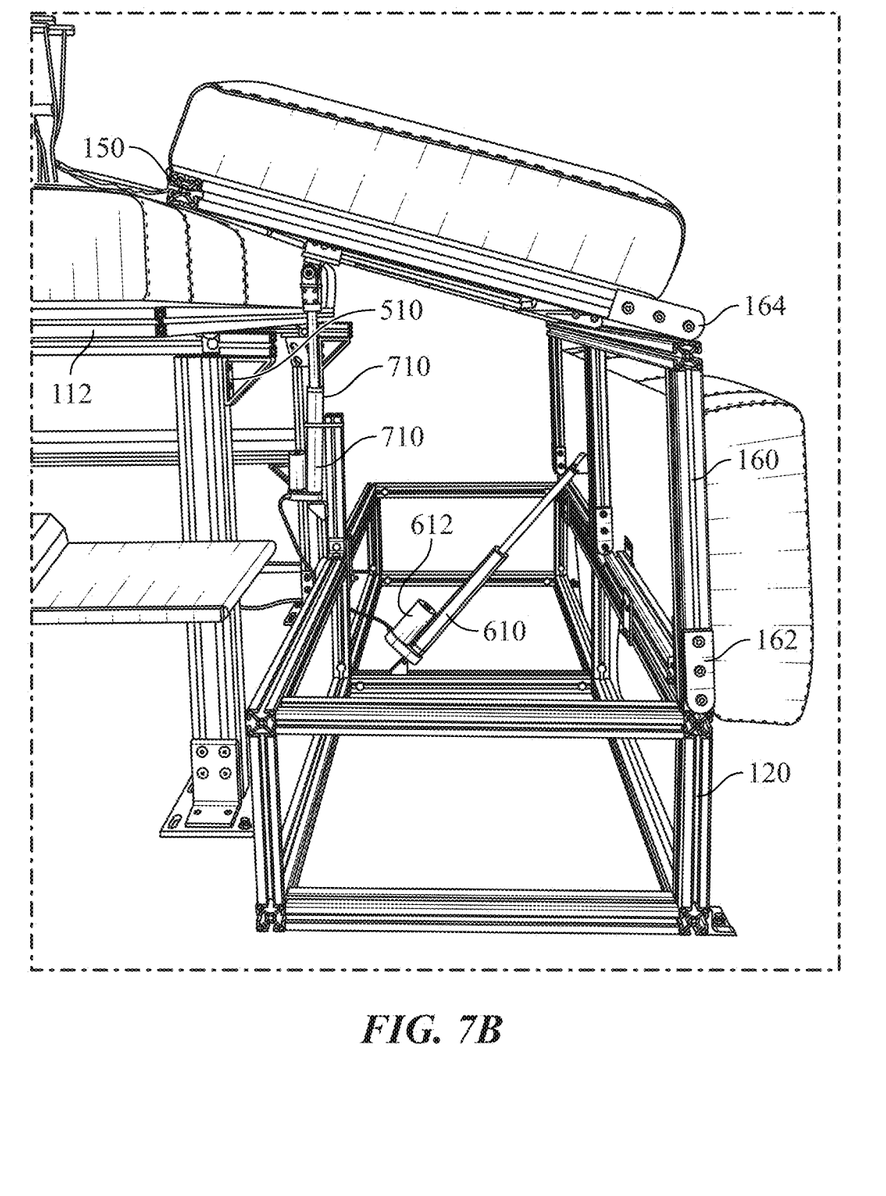

FIG. 7B illustrates a side view of a second intermediate position of a bed conversion system in accordance with the principles of the invention.

In this illustrate example, seat 160 is raised to substantially vertical position with respect to bench section 120. In this illustrated case, strut 610 is substantially fully extended. Further illustrated is linear strut 710 attached to an underside of back section 150. Linear strut 710 provides control and placement of back section 150 with respect to frame 112.

Figure 8:
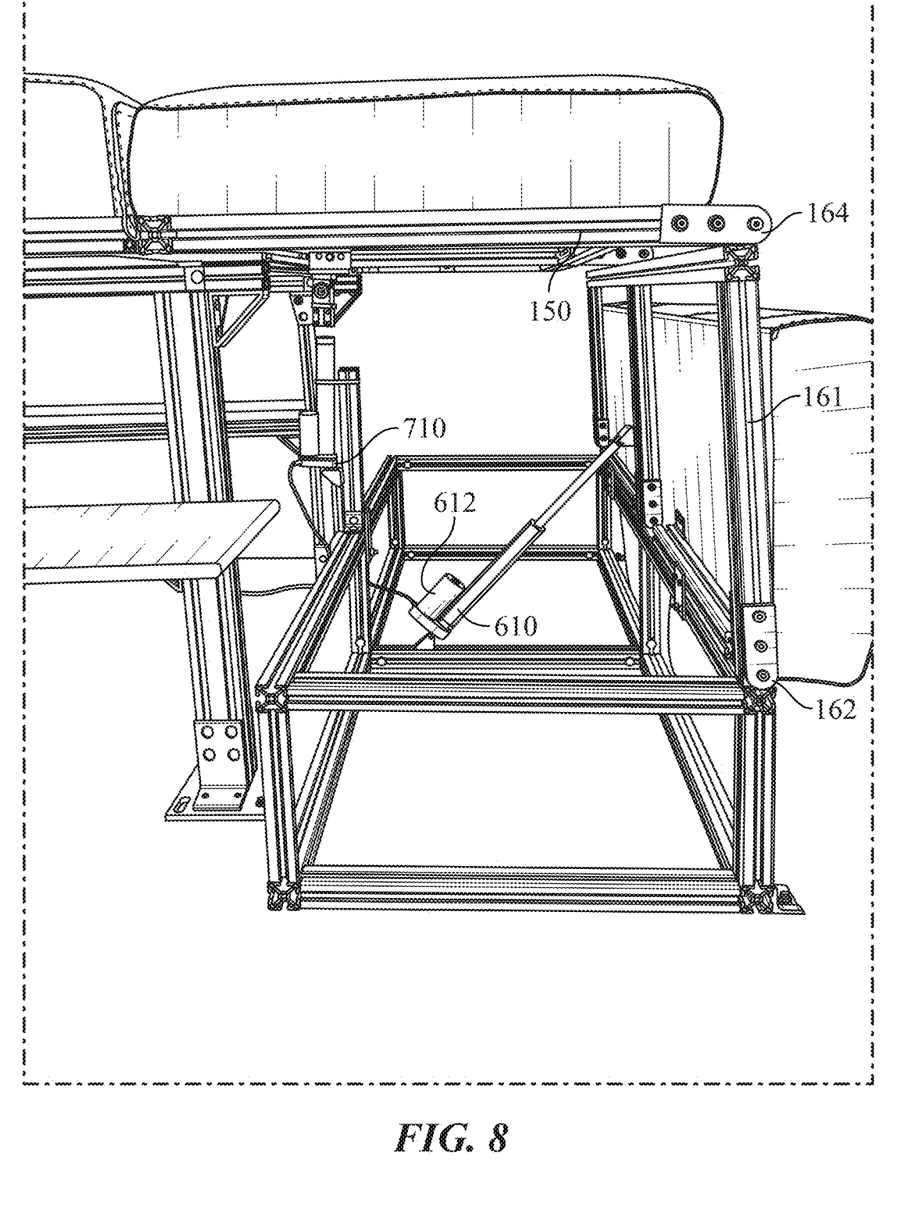
FIG. 8 illustrates a side view of final position of a fold-up bed conversion system in accordance with the principles of the invention.

FIG. 8 illustrates a side view of the final position of a bed conversion system shown herein.

In this illustrated configuration, bed conversion system 100 is shown in a final position, wherein seat 160 is rotated into a substantially vertical position and back section 150 is rotated into a substantially horizontal position in-line (i.e., a congruent relationship) with frame 112. Further shown is back section 150 contacting ledge 510 to retain bench section 150 substantially horizontal.

Further illustrated are actuators 610 and 710 that may be used to mechanically or electro-mechanically position bench section 150 and seat section 160 into the illustrated final position. In one aspect of the invention, actuator 610 is rotatably attached to an undersurface of seat section 160. Thus, as actuator 610 extends from a closed position (not shown), wherein seat section 160 is positioned on top surface 128 of frame 120, to an open position (shown), seat section 160 is moved to a substantially vertical position with respect to top surface 128. Essentially concurrently, actuator 710 is extended from a closed position (not shown) as actuator 610 move seat 160, to a second position (shown) to position back section 150 in-line with frame 112. Actuator 710 provides for the adjustment of the positioning of bench section 150 with respect to frame 112. Actuators 610 and 710 may be electrically controlled by one or more motor assemblies (as shown in FIGS. 6A and 6B) that provide for the expansion and contraction of linear actuators 610 and 710. In one aspect of the invention, actuators 610 and 710 may be powered by an alternating current electrical source. In another aspect of the invention, actuators 710 and 720 may be powered by a direct current source (not shown).

Figure 9:
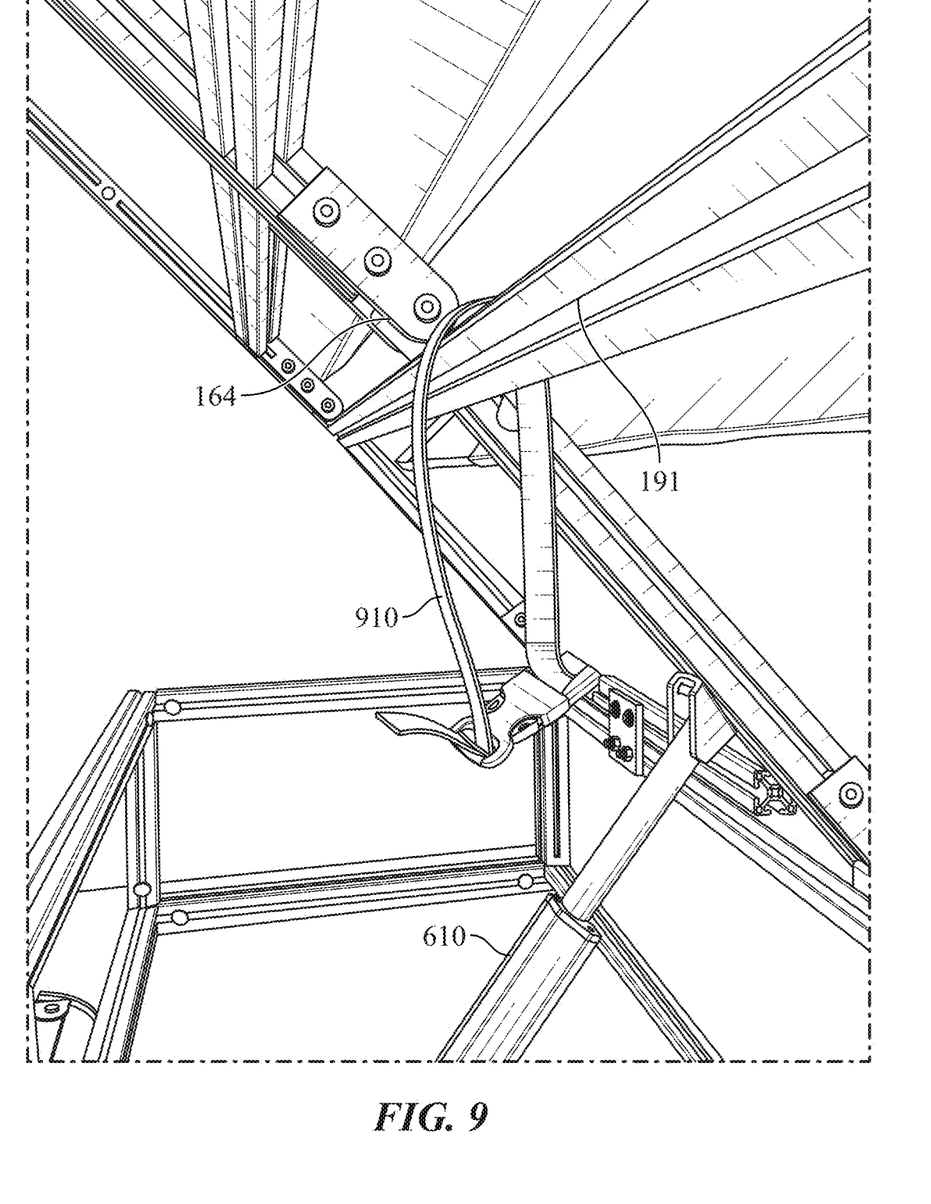
FIG. 9 illustrates a side view of intermediate position of a second aspect of the fold-up bed conversion system in accordance with the principles of the invention.

FIG. 9 illustrates a side view of intermediate position of a second aspect of the fold-up bed conversion system in accordance with the principles of the invention.

In this illustrated embodiment, a strap element 910 may be connected to horizontal member 191 wherein strap element 910 may be pulled upward to cause the rotational movement of seat 160 about hinge 162.

In accordance with this aspect of the invention, actuators 610 and 710 may comprise air-struts that may be used to assist in the manual operation of bed conversion in accordance with principles of the invention.

In accordance with the principles of the invention, a fold-up bed configurations is disclosed that increases the length of a bed (e.g., twin, full, queen, king) within a confined area without requiring additional cushions increases the usable storage area as separate cushions need no longer be stored within the space.

Although the fold-up convertible bench/bed has been discussed with regard to campers and RTVs, it would be recognized that the invention disclosed is applicable to other situations where space is a premium issue. For example, limited space studio apartments or child bedrooms.

Many different embodiments have been disclosed herein, in connection with the above description. It will be understood that it would be unduly repetitious and obfuscating to literally describe every combination and subcombination of these embodiments. Accordingly, all embodiments can be combined in any way and/or combination, and the present specification, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly described hereinabove. A variety of modifications and variations are possible in light of the above teachings without departing from the following claims.

What is claimed is:

1. A bed conversion system comprising; a bed section comprising:
    a bed section frame substantially horizontal to, and raised above, a floor upon which said bed section stands;
    a bench section positioned at a proximal end of said bed section, said bench section comprising:
    a seating frame; and
    a seat assembly comprising:
    a back arranged offset from a vertical to said seating frame; and
    a seat arranged on a top surface of said seating frame, wherein a distal end of said seat is rotationally attached to a back section and a proximal end of said seat is rotationally attached to a proximal end of said seating frame;
    means to arrange said back substantially horizontally in-line with said bed section frame;
    wherein said seat comprises:
    a plurality of struts spanning from a proximal end of said seat to a distal end of said seat; and
    a first connector bar connected to said plurality of struts along said distal end of said seat;
    wherein each of said plurality of struts comprises: a proximal end hinge configured to connect said seat to said proximal end of bench; and
    a distal end hinge configured to connected said seat to said back.

2. The bed conversion system of claim 1, wherein said proximal end hinge is configured to: rotate at least ninety (90) degrees; and
    said distal end hinge is configured to:
    to rotate at least two-hundred seventy (270) degrees.

3. The bed conversion system of claim 1, wherein said proximal end hinge comprises:
    a proximal end strut passthrough positioned on said proximal end of said strut, wherein a proximal end pin inserted through said proximal end strut passthrough connects said seat to said bench; and
    a distal end hinge comprises:
    a distal end passthrough, wherein a distal end pin inserted through said distal end passthrough connects said back to said seat.

4. The bed conversion system of claim 3, wherein a distal end of each of said seat struts is interconnected with said back, wherein said interconnection forming a distal hinge configured to rotatably reposition said back with respect of said seat.

* * * * *